(12) United States Patent
Heikkila et al.

(10) Patent No.: US 6,350,397 B1
(45) Date of Patent: Feb. 26, 2002

(54) OPTICAL MEMBER WITH LAYER HAVING A COATING GEOMETRY AND COMPOSITION THAT ENHANCE CLEANING PROPERTIES

(75) Inventors: Kurt E. Heikkila, Marine on the St. Croix; James E. Fairman, Bloomington; Russell J. Pylkki, Roseville; Michael S. Arney, Minneapolis; Douglas E. Wilken, Foley, all of MN (US)

(73) Assignee: Aspen Research Corporation, St. Paul, MN (US)

(*) Notice: Subject to any disclaimer, the term of this patent is extended or adjusted under 35 U.S.C. 154(b) by 0 days.

(21) Appl. No.: 09/517,812

(22) Filed: Mar. 2, 2000

Related U.S. Application Data

(60) Provisional application No. 60/123,560, filed on Mar. 10, 1999.

(51) Int. Cl.[7] .................... B32B 17/06; B32B 9/00; B05D 5/06
(52) U.S. Cl. .................... 264/39; 428/426; 428/427; 428/428; 428/432; 428/446; 428/450; 427/162; 427/164; 427/165
(58) Field of Search .................... 428/426, 427, 428/428, 446; 264/39; 427/162, 164, 168

(56) References Cited

U.S. PATENT DOCUMENTS

| | | |
|---|---|---|
| 2,442,976 A | 6/1948 | Heany |
| 2,809,124 A | 10/1957 | Rick |
| 3,676,097 A | 7/1972 | Plumat et al. |
| 3,754,980 A | 8/1973 | Malmendier |
| 3,810,744 A | 5/1974 | Dumbaugh, Jr. et al. |
| 4,011,149 A | 3/1977 | Nozik |
| 4,019,887 A | 4/1977 | Kirkbride et al. |
| 4,105,821 A | 8/1978 | Blaich et al. |
| 4,188,444 A | 2/1980 | Landau |
| 4,780,372 A | 10/1988 | Tracy et al. |
| 4,855,176 A | 8/1989 | Ohwaki et al. |
| 4,946,712 A | 8/1990 | Goodman et al. |
| 5,006,248 A | 4/1991 | Anderson et al. |
| 5,035,784 A | 7/1991 | Anderson et al. |
| 5,073,451 A | 12/1991 | Iida et al. |

(List continued on next page.)

FOREIGN PATENT DOCUMENTS

| | | |
|---|---|---|
| EP | 251347 A1 | 1/1988 |
| EP | 556966 A1 | 8/1993 |
| EP | 594171 A1 | 4/1994 |
| EP | 637616 A1 | 2/1995 |
| EP | 0 658 525 A2 | 6/1995 |
| EP | 0 748 775 A2 | 12/1996 |
| EP | 0 882 686 A1 | 12/1998 |
| EP | 0 887 179 A1 | 12/1998 |
| JP | 084612 | 12/1984 |
| JP | 238304 | 6/1986 |
| JP | 87-95478 | 4/1987 |
| JP | 075267 | 10/1987 |
| JP | 133381 | 12/1987 |
| JP | 01-14129 | 1/1989 |
| JP | 289337 | 5/1989 |

(List continued on next page.)

OTHER PUBLICATIONS

Viinodgopal et al., "Electrochemically assisted photocatalysis using nanocrystalline semiconductor thin films," *Solar Energy Materials and Solar Cells,* 1995, vol. 38, No. 1/4, pp. 401–410.

Sauer et al., "Acetone oxidation in a photocatalytic monolith reactor," *Journal of Catalysis,* vol. 149, No. 1 Sep. 1994, pp. 81–91.

Schwitgebel et al., "Role of the Oxygen Molecule and of the Photogenerated Electron in $TiO_2$–Photocatalyzed Air Oxidation Reactions," *The Journal of Physical Chemistry,* vol. 99, No. 15, Apr. 13, 1995, pp. 5633–5638.

Takeda et al., "Effect of inert supports for $TiO_2$ loading on enhancement of photodecomposition rate of gaseous propinonaldehyde," *The Journal of Physical Chemistry,* vol. 99, No. 24, Jun. 15, 1995, pp. 9986–9991.

Wong et al., "Photooxidation of CH, Cl on $TiO_2$ (110) single crystal and powdered $TiO_2$ surfaces," *The Journal of Physical Chemistry,* Vo. 99, No. 1, Jan. 5, 1995, pp. 335–344.

Vinodgopal et al., "Electrochemically assisted photocatalysis. 2. The role of oxygen and reaction intermediates in the degradation of 4–chlorophoenol on immobilized $TiO_2$films," *The Journal of Physical Chemistry,* vol. 98, No. 27, Jul. 7, 1994, pp. 6797–6803.

(List continued on next page.)

*Primary Examiner*—Robert Dawson
*Assistant Examiner*—Michael J Feely
(74) *Attorney, Agent, or Firm*—Merchant & Gould P.C.

(57) ABSTRACT

An improved transparent optical member, preferably a glass sheet, comprising a nanostructure layer with an enhanced geometry and a balance of chemical (hydrophobic and hydrophilic) characteristics can be formed on a surface. The geometry and chemistry of the layer combine to obtain improved washability. The layer can be manufactured by forming a layer comprising a silicon compound coating, including a silicon oxide coating, a silicon carbide coating, a silicon nitride coating or mixtures thereof. The coating can have a having a thickness of about 1 to 100 nm ($10^{-9}$ meter). The layer has a preferred roughens from a random or ordered array of structure. The layer can be doped with di tri or polyvalent metal compounds. Such coatings have been found to have increased washability and such coatings have been found to preferentially bind to aqueous solutions applied to the glass. The hydrophilicity and preferential binding to aqueous solutions (wetability) tends to displace any soil deposited or contacted with the glass surface. As a result, the glass tends to associate with aqueous solutions and to disassociate soil when contacted with aqueous solutions substantially increasing the ease of cleaning the glass surface using water, aqueous cleaning solutions, etc.

30 Claims, 3 Drawing Sheets

U.S. PATENT DOCUMENTS

| | | | |
|---|---|---|---|
| 5,096,745 A | 3/1992 | Anderson et al. | |
| 5,110,637 A | 5/1992 | Ando et al. | |
| 5,133,791 A | 7/1992 | Yagami et al. | |
| 5,135,808 A | 8/1992 | Kimock et al. | |
| 5,143,533 A | 9/1992 | Brusasco | |
| 5,182,143 A | 1/1993 | Holmes-Farley et al. | |
| 5,192,352 A | 3/1993 | Kuwabara et al. | |
| 5,211,734 A | 5/1993 | Yagami et al. | |
| 5,304,399 A | 4/1994 | Shibata et al. | |
| 5,324,566 A | 6/1994 | Ogawa et al. | |
| 5,354,715 A | 10/1994 | Wang et al. | |
| 5,402,262 A | 3/1995 | Falk et al. | |
| 5,466,487 A | 11/1995 | Ohtake et al. | |
| 5,517,350 A | 5/1996 | Cabrera et al. | |
| 5,554,204 A | 9/1996 | Kotaka et al. | |
| 5,556,667 A | 9/1996 | Teranishi et al. | |
| 5,576,109 A | 11/1996 | Yoneda et al. | |
| 5,578,103 A | 11/1996 | Araujo et al. | |
| 5,589,272 A | 12/1996 | Braun et al. | |
| 5,594,585 A | 1/1997 | Komatsu | |
| 5,624,760 A | 4/1997 | Collins et al. | |
| 5,643,349 A | 7/1997 | Piper et al. | |
| 5,643,423 A | 7/1997 | Kimock et al. | |
| 5,643,638 A | 7/1997 | Otto et al. | |
| 5,660,611 A | 8/1997 | Ishikawa et al. | |
| 5,665,424 A | 9/1997 | Sherman | |
| 5,674,592 A | 10/1997 | Clark et al. | |
| 5,688,561 A | 11/1997 | Ichikawa et al. | |
| 5,695,876 A | 12/1997 | Franz et al. | |
| 5,718,976 A * | 2/1998 | Dorfman et al. | 428/408 |
| 5,721,181 A | 2/1998 | Sehgal et al. | |
| 5,723,172 A | 3/1998 | Sherman | |
| 5,750,265 A | 5/1998 | Goodman | |
| 5,756,192 A | 5/1998 | Crawley et al. | |
| 5,759,696 A | 6/1998 | Alers | |
| 5,763,064 A | 6/1998 | Suzuki et al. | |
| 5,776,603 A | 7/1998 | Zagdoun et al. | |
| 5,798,142 A | 8/1998 | Soubeyrand | |
| 5,798,324 A | 8/1998 | Svoboda | |
| 5,800,918 A | 9/1998 | Chartier et al. | |
| 5,830,568 A | 11/1998 | Kondo | |
| 5,834,103 A | 11/1998 | Bond et al. | |
| 5,837,108 A | 11/1998 | Lingle et al. | |
| 5,843,200 A | 12/1998 | Richards | |
| 5,873,203 A | 2/1999 | Thiel | |
| 5,939,201 A | 8/1999 | Boire et al. | |
| 6,027,766 A | 2/2000 | Greenberg et al. | |
| 6,068,914 A | 5/2000 | Boire et al. | |
| 6,103,363 A | 8/2000 | Boire et al. | |

FOREIGN PATENT DOCUMENTS

| | | |
|---|---|---|
| JP | 02-54055 | 2/1990 |
| JP | 2-191349 | 7/1990 |
| JP | 084229 | 10/1990 |
| JP | 03-29793 | 2/1991 |
| JP | 06278244 A | 10/1994 |
| JP | 07-164971 | 6/1995 |
| JP | 08-227006 | 9/1996 |
| NL | 6919053 | 6/1971 |
| WO | WO 89/08621 A1 | 9/1989 |
| WO | WO 98/41480 | 9/1998 |
| WO | WO 98/41482 | 9/1998 |

OTHER PUBLICATIONS

Rajeshwar, "Photoelectrochemistry and the environment," *Journal of Applied Electrochemistry*, vol. 25, No. 12, Dec. 1995, pp. 1067–1081.

Fan et al., "Transparent heat mirrors for solar–energy applications," *Applied Optics*, vol. 15, No. 4, Apr. 1976, pp. 1012–1017.

Sopyan et al., "Efficient $TiO_2$ powder and film photocatalysts with rutile crystal structure," *Chemistry Letters*, 69 (1996), pp. 69–70.

Sauer et al., "Photocatalyzed oxidation of ethanol and acetaldehyde in humidified air," *Journal of Catalysis*, vol. 158, No. 2, Feb. 1996, pp. 570–582.

Sopyan et al., "An efficient $TiO_2$ thin–film photocatalyst: photocatalytic properties in gas–phase acetaldehyde degradation," *Journal of Photochemistry and Photobiology A: Chemistry*, vol. 98, Nos. 1–2, Aug. 1996, pp. 79–86.

"Standard Guide for Testing Cleaning Performance of Products Intended for Use on Resilient Flooring and Washable Walls", *ASTM Designation: D 4488—95*, pp. 467–481 (Published Jun. 1995).

"Standard Practice for Preparation of Contaminated Test Coupons for the Evaluation of Cleaning Agents", *ASTM Designation: G 121—93*, pp. 1381–1384 (Published Oct. 1993).

"Standard Test Method for Corona–Treated Polymer Films Using Water Contact Angle Measurements", *ASTM Designation: D 5946—96*, pp. 720–724 (Published Jun. 1996).

"Standard Test Method for Detergent Resistance of Floor Polish Films", *ASTM Designation: D 3207—92*, pp. 335–336 (Published Oct. 1992, Reapproved 1996).

"Standard Test Method for Evaluating the Effectiveness of Cleaning Agents", *ASTM Designation: G 122—96*, pp. 1385–1387 (Published Dec. 1996).

"Standard Test Method for Hydrophobic Contamination on Glass by Contact Angle Measurement", *ASTM Designation: C 813—90*, pp. 256–257 (Published Jan. 1991, Reapproved 1994).

"Standard Test Methods for Practical Washability of Organic Coatings", *ASTM Designation: D 4828—94*, pp. 374–377 (Published Nov. 1994).

"Standard Test Method for Scrub Resistance of Paints by Abrasion Weight Loss", *ASTM Designation: D 4213—96*, pp. 252–255 (Published Aug. 1996).

"Standard Test Method for Soil Resistance of Floor Polishes", *ASTM Designation: D 3206—92*, pp. 333–334 (Published Oct. 1992, Reapproved 1996).

"Standard Test Method for Surface Wettability and Absorbency of Sheeted Materials Using an Automated Contact Angle Tester", *ASTM Designation: D 5725—95*, pp. 836–842 (Published Sep. 1995).

"Standard Test Method for Surface Wettability of Paper (Angle–of–Contact Method)", *ASTM Designation: D 724—94*, pp. 65–67 (Published Jun. 1994).

"Standard Test Method for Washability Properties of Interior Architectural Coatings", *ASTM Designation: D 3450—94*, pp. 163–165 (Published Nov. 1994).

"$\mu$Scan®—Surface Roughness and Scatter Measurement Instrumentation" (Product Description and Price List), Schmitt Measurement Systems, Inc., 7 pgs. (Dec. 1997).

Walheim, S. et al., "Nanophase–Separated Polymer Films as High–Performance Antireflection Coatings", *Science*, vol. 283, pp. 520–522 (Jan. 22, 1999).

Walheim, S. et al., "Structure Formation via Polymer Demixing in Spin–Cast Films", *American Chemical Society*, 9 pgs. (1997).

Wang, T. et al., "Modification of Wettability of a Stainless–Steel Plate by Cathodic Plasma Polymerization of Trimethylsilane–Oxygen Mixtures", *Journal of Applied Polymer Science,* vol. 55, pp. 903–909 (1995).

Yongxing, Q. et al., "Characterization of Amphiphilic and Microphase Separated Graft Copolymers II Surface Characterization and In Vitro Blood–Compatibility Assessment of Polystyrene–Graft–ω–Stearyl–Poly(Ethylene Oxide)", *Chinese Journal of Polymer Science,* vol. 13, No. 2, pp. 112–125 (1995).

Awaya, N. et al., "Selective Deposition of Silicon Oxide and Its Application", *The 17th Conference on Solid State Devices and Materials,* pp. 18–19 (Aug. 25–27, 1985).

Böltau, M. et al., "Surface–Induced Structure Formation of Polymer Blends on Patterned Substrates", *Nature,* vol. 391, pp. 877–879 (Feb. 26, 1998).

"Glass Cleaners—CSMA Designation DCC–09—May 1983", *CSMA Detergents Division Test Methods Compendium—Third Edition,* pp. I15–I16 (1995).

Gonzalez, P. et al., "Photo–Induced Chemical Vapour Deposition of Silicon Oxide Thin Films", *Thin Solid Films,* vol. 218, pp. 170–181 (1992).

"Light Scatter—A New Light On Quality", http://www/schmitt–ind.com/html/techbul.htm, 6 pgs. (printed on Jan. 29, 1999).

"Precision Metrology Lab—Surface Metrology", http://www.coe.uncc.edu/~jgsalsbu/metrology/lab/surface.htm, 3 pgs. (printed on Feb. 5, 1999).

Rumak, N.V. et al., "Structure and Properties of Silicon Dioxide Thermal Films", *Phys. Stat. Sol.,* vol. 86, pp. 477–484 (1984).

Schuegraf, K. et al., "Reliability of Thin $SiO_2$", *Semicond. Sci. Technol.,* vol. 9, pp. 989–1004 (1994).

Ulman, A., "Wetting Studies of Molecularly Engineered Surfaces", *Thin Solid Films,* vol. 273, pp. 48–53 (1996).

* cited by examiner

OPTICAL MEMBER WITH LAYER HAVING A COATING GEOMETRY AND COMPOSITION THAT ENHANCE CLEANING PROPERTIES

This application claims benefit to U.S. provisional application Ser. No. 60/123,560, filed Mar. 10, 1999.

FIELD OF THE INVENTION

The invention relates to an improved optical member such as a transparent, planar, curved or shaped member or glass sheet having at least one layer or coating that provides useful, improved washability or cleanability properties. The coatings of the invention provide a surface composition and a shaped nanostructure that promotes removal of particulate soils when the surface and soil are contacted with water or aqueous cleaning solution. More particularly, the invention relates to an optical member used in a window pane, window light, window glass, wind screen, electronic display, wind shield or other substantially planar transparent member used in any structure, conveyance, instrument, device, etc., using a transparent member to permit viewing through or across a boundary.

BACKGROUND OF THE INVENTION

Optical or transparent members are made of materials that permit transmittal of light in a manner that does not substantially distort an image. Such images include an aspect or environmental scene, an interior setting, an incandescent or florescent image, etc. Transparent members are typically made of non-crystalline materials used above the glass transition temperature. Transparent materials include inorganic glasses such as silicate glass, silicate-soda ash glass, borosilicate glass, etc.; thermoplastics such as polycarbonate, acrylic, etc. and other specialty crystalline and glassy materials.

The most common transparent members comprise silicate, and silicate-soda ash glass. Such glass technology has evolved since antiquity. These glass materials are typically understood to be an inorganic substance in a highly thickened but "liquid" state of the substance. As a result of a reversible change in viscosity, such materials attain such a high degree of viscosity to be, for all practical purposes (in a 40+ year useful life) rigid and non-flowing. Common silicate-soda ash window glass is manufactured from commonly available silicate ($SiO_2$) minerals and carbonate ($Na_2CO_3$) minerals. The basic structure of silicate glass is the silicon-oxygen tetrahedron in which a silicon atom is in an $sp^3$ tetrahedral bonding structure coordinated to four surrounding oxygen atoms. The oxygen shared between tetrahedron are called bridging oxygens. Virtually all such glass compositions comprise silicate glasses containing modifiers and intermediates. The addition of a modifier such as sodium oxide, boron compounds or sodium carbonate to the silica network alters the structure cleaving Si—O—Si bonds to form an Si—O—$Na^+$ or other modified linkage. Examples of chemicals that have been used to improve the physical nature of the glass layer include alkaline earth metal compounds; boric oxide compounds; alumino-silicate glass generating compounds; lead compounds; borate and phosphate glass compounds; oxides including germanium, arsenic, antimony oxides, etc,; sulfur, selenium and tellurium compounds; and halogens such as zinc chloride, and $BeF_2$ are also known. The purpose of these chemical modifications to the glass composition improves the mechanical properties such as hardness, the chemical stability, the heat resistance, or other physical or optical properties of the glass relating to end use requirements.

Most silica glass currently manufactured results from a process in which raw materials are converted at very high temperatures to an homogeneous flowable melt. The melt results from heating a combination of one or more typical ingredients such as glass sand ($SiO_2$), soda ash (sodium carbonate), limestone ($CaCO_3$), feldspar or other inorganic oxides such as potassium oxide, magnesium oxide, zinc oxide, barium oxide, lead oxide, etc. The inorganic materials are blended and melted at high temperatures typically from about 1500° C. to 1800° C. forming a flowable melt. The melt is then drawn from the heater and is drawn, rolled or quenched depending on the desired shape and end use. Bottles, dishes, optical lenses, tubes, sheets, cylinders, etc. are formed by floating, blowing, pressing, casting or spinning the glass to cool the glass to a solid. Large glass sheets are typically manufactured by floating the melt on molten tin in a non-oxidizing or reducing environment to form a planar extremely flat glass sheet with parallel faces. The glass face contacting the tin bath tends to acquire an amount of tin oxide ($SnO_2$) on the glass that typically range in trace amounts on the glass sheet. Such tin residues do not comprise any nanostructure regions but are only a random surface scattering of tin oxide. These chemically modified glasses typically enhance the macro thermal, electrical and mechanical properties of the gross material.

The formation of association of one or more functional layers with one or more transparent layers of an optical member or glass sheet is also known. Mirrored layers have been made since antiquity. The association of a macro polymeric layer with one or more glass sheets is also known, for example, Safety glass in automobile manufacture comprises a sandwich comprising two layers of glass with an intermediate polyvinylbutyral layer. Optical members such as glass sheets have been surface modified using various chemical deposition techniques to form organic and inorganic layers on the glass. Such layers have been combined with organic silicone compounds, organic film forming materials, surface derivatizing organic materials, olefinic polymeric forming compositions and other materials that form macro layers on the glass surface. The formation of inorganic coatings on glass sheets is also commonly performed during glass manufacture. At high temperature, glass sheets tend to favorably react with organic and inorganic materials to form active macro coatings on the glass. Kirkbride et al., U.S. Pat. No. 4,019,887; Landau, U.S. Pat. No. 4,188,444; Shibata et al., U.S. Pat. No. 5,304,399; and others show the formation of a silicon or silica complex from continuous chemical treatment of the hot glass substrate with a non-oxidizing reactive silane containing compound. The formation of other simple macro layers using such deposition techniques is well within the skill of the ordinary artisan in this technology area. These relatively simple macro coatings typically improve the mechanical, chemical and thermal resistance of the glass surface to conditions in its use locus.

Coatings on optical members such as glass sheets having an improved geometry are also known. Ohwaki et al., U.S. Pat. No. 4,855,176, disclose macro structures (structures having millimeter size dimensions) with hydrophilic and hydrophobic regions to improve the anti-blurring properties of optical members used in windows, mirrors, etc. Similar to the technology shown in the Ohwaki et al. disclosure other patents relate to forming macro films on optical members that have varying degrees of tendency to associate with aqueous materials such as Komatsu, U.S. Pat. No. 5,594, 585, which shows a hydrophilic film made from silicon dioxide. Sugawara et al., Japanese Application No. 07-33599, show a hydrophilic mirror coating comprising a metal oxide having a macro structure. Kai et al., Japanese Application No. 05-315261, show a hydrophilic mirror coating comprising silicon dioxide, zirconium dioxide, titanium dioxide, aluminum oxide and others to form a surface that rapidly drains incident water. Endo et al., Japanese Application No. 62-168702, show a hydrophilic transparent film made from indium oxide, tin oxide and others. Tiller et al., European Application No. 594171, disclose a $SiO_x$ coating using flame-pyrolytic deposition of an organo silane to form a hydrophilic surface.

The prior art taken as a whole focuses on forming chemical modified surface layers having thick layers or macro structures (dimension greater than 1 mm) for the purpose of improving chemical, thermal and physical resistance and to improve the hydrophilicity of the surface to improve visibility.

Self-cleaning glass technology is also known and are different in mechanism than improved cleaning materials. The improved cleaning technologies creates a structure that reduces the binding energy of the soil to the glass coatings. Self cleaning technology involves the manufacture of glass compositions or coatings that tend to absorb incident photons of visible light into surface layers and then convert such incident energy into an excited glass effect or excited surface coating effect that tends to energetically disassociate or desorb a soil particulate or layer from the surface. Currently, titanium dioxide ($TiO_2$ containing layers) are being developed which can absorb typically ultraviolet light to increase self-cleaning properties. Self-cleaning technologies are described in "Light-induced amphilic surfaces," R. Wang et al., NATURE, Vol. 388, (1997) p. 431; "Photogeneration of Highly Amphilic $TiO_2$ Surfaces," R. Wang et al., Advanced Materials, Vol. 10, No. 2 (1998) pp. 135–138; "Photooxidately self-cleaning transparent titanium dioxide films on soda lime glass: The deleterious effect of sodium contamination and its prevention," Y. Paz et al., J. Mater. Res., Vol. 12, No. 10 (1997) pp. 2759–2766; and "Photooxidative self-cleaning transparent titanium dioxide films on glass,". Paz et al., J. Mater. Res., Vol. 10, No. 11 (1995) pp. 2842–2848.

Recently, significant interest has arisen regarding technologies that improve the washability or cleanability of glass surfaces. Washability or cleanability relates to the ease of removing a variety of soils including hydrophilic soils, hydrophobic soils, particulate soils, etc. from glass surfaces. Such properties are measured using known techniques. In our initial work in this area, we have found the technologies disclosed above provide no important improvement in cleanability or washability of the glass layers. We believe the simple macro modifications of the glass surface are not engineered to promote the removal of colloidal-sized particles of soil associated with the glass surface. We believe a substantial improvement in surface technology is required to result in substantial improvement in cleanability or washability of optical members such as glass, lights or sheets.

BRIEF DESCRIPTION OF THE INVENTION

During the exposure of an optical member to its environment, the surface can acquire soil forming a residue. Large gross soils can readily be removed simply with a water jet or spray. Difficult to remove soils typically comprise relatively small particulate compositions that become closely associated with a glass surface. Such particulate materials arise as a collection of particulate. Each particle is typically colloidal in size and can have a dimension that ranges from about $100 \times 10^{-9}$ meters to about $100 \times 10^{-7}$ meters (100 to 10,000 nm). We believe such particles have a nature, or attain a surface charge, that causes a strong binding or association of the particulate to the glass surface that, in combination with normal VanderWalls forces results in an association with the glass surface that results in a hard to remove soil contamination. We have found that the strong association of such soils with optical member surfaces can be substantially weakened and rendered more washable or cleanable using a nanostructure coating technology. In the nanostructure technology of the invention, an ordered or random surface structure having a nanostructure dimension of between 1 and 500 nanometers, preferably 2 to 100 nanometers (nanometers or nm, $10^{-9}$ meters) having at least a hydrophic region or at least a hydrophobic region in the structure can cause a substantial reduction in the association or binding strength of the particulate soil with the glass surface. Typically the particle is more easily cleaned if it is residing on a nanostructure with a size substantially less than the particle. Both the size of the surface structure and the chemical nature of the surface reduces the binding strength or degree of association of the particulate to the surface. The surface structure or roughness on a nanoscale can reduce the binding association of the particle with the surface since such binding associations tend to be reduced by a factor of $1/r^6$ as the particulate is withdrawn from the surface. The structure or roughness of the surface tends to cause the particle to associate with a smaller or reduced quantity or fraction, less than about 10% of the nanostructure surface. The relatively large particle resides on a relatively small nanostructure. The majority of the particle surface tends to be remote from the nanostructure and contributes substantially less to its binding association because of the nature of the binding forces. Further, the structure, containing enhanced hydrophilicity or enhanced hydrophobicity, or both, tend to reduce the surface bonding association of the particulate with the surface since individual soil particles tend to be either hydrophilic or hydrophobic and tend to be repelled by surfaces with a different character. Accordingly, the creation of a nanostructure surface having a preferred geometry combined with a preferred chemical nature can substantially improve the cleanability and wettability of optical members when contacted with aqueous cleaning materials.

The soil materials that are the focus of the application are soil particulate materials that can comprise either hydrophilic or hydrophobic compositions. These particles have sufficient size such that they are substantially affected by gravity when suspended in the air. Such particles are of sufficient size to adhere by hydrophilic and hydrophobic properties or Vander Walls forces or electric charge mechanisms to the surface of an optical member. Particles smaller than about 200 nanometers are simply too small to cause any significant permanent association with a window surface and as a result typically do not form a soil deposit. Particles of significant size, i.e. greater than about 100 microns, typically are relatively easily removed because of size and weight. Particles of intermediate size, 200 nm to 100 microns, particularly particles that can support a significant charge density are made of materials with substantial hydropobicity or hydrphilicity can cause a tenacious binding or association with the glass surface resulting in a difficult to remove soil. Collections of colloidal particles typically having a particle size that range from about 100 nanometers to about 10 microns tend to include the most tenacious and most difficult to remove soil deposits. It is this type of particulate soil that is of greatest concern to washing or cleaning the optical member surfaces of the invention. For the purpose of this application, the term "macro" tends to relate to structures having a minor dimension that is typically greater than about 1 millimeter. The term "micro" is intended to refer to structures having a minor dimension that is typically greater than about 1 micrometer ($10^{-6}$ meters). The term "nanostructure" typically refers to structures having a minor dimension that is greater than about 1 nanometer but typically substantially less than about 800 nanometers, often about 10 to 500 nm, preferably about 50 to 300 nanometers.

DETAILED DISCUSSION OF THE INVENTION

Figure 1:
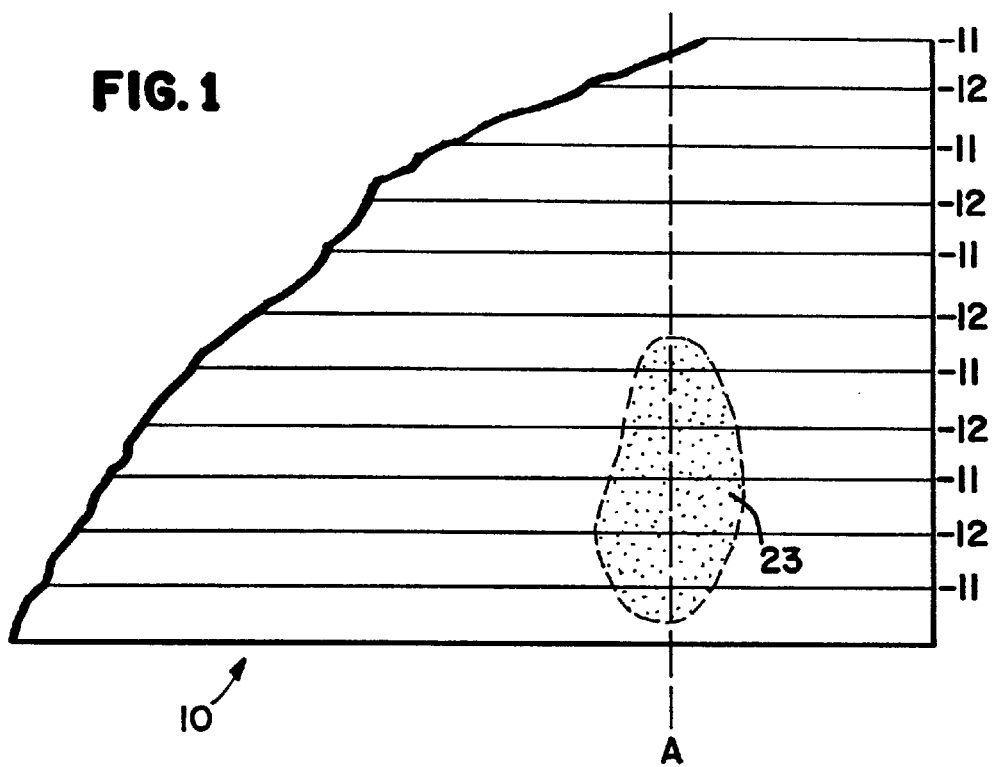
FIGS. 1 and 2 show a plan view and cross-section of a glass sheet with a regular nanostructure coating of the invention. The figures show a single regular layer formed on the glass comprising the easily cleaned or washed coating of the invention.

The improved glass sheet of the invention comprises a glass sheet having a nanostructure coating on one or both surfaces. The coating comprises a coating of a silicon compound, a noble metal or compound thereof, an aluminum compound, a zirconium compound, a titanium compound, a vanadium compound or other coating metal compounds, the coating also comprising a dopant. Preferred coating comprise silicon oxide, silicon nitride, silicon carbide. The dopant comprises a polyvalent metal or mixtures thereof, having a valence of +2, +3, +4, +5, +6 or +7. In certain structures the dopant can comprise $N^{+n}$ or $N^{-n}$, wherein n ranges form $-7$ to $+3$; $B^{+3}$ or other non-metal dopant materials. In other structures the dopant can comprise a noble gas in the layer.

The dopant can be added while the coating is being formed on the glass or can be doped into the coating after the initial coating is formed. We have found that the structures of the coating can have an improved chemistry by forming a coating from a coating material discussed above such as a silicon compound. In the case of silicon dioxide ($SiO_2$), silicon carbide (SiC), silicon nitride ($Si_3N_2$) or other similar inorganic coating compounds, the post-treatment of such layers result in the formation of hydrophilic groups such as hydroxyl (—OH) surface groups, such as a:

HO—Si—O—Si—OH group in the case of a silicon coating, wherein the Si—O—Si is a part of the glass structure, can improve the surface hydrophilicity of the improved cleanability layer of the invention. Further, the treatment of the surface to form less hydrophilic groups such as a bridged silicon oxide group:

—O—Si—O—Si—O— wherein the —O moiety leads to a silicone atom, can substantially reduce the hydrophilicity of the surface producing a relatively hydrophobic layer. Further, other types of chemical treatments can enhance hydrophilicity or enhance hydrophobicity in the appropriate regions. In other coatings on other members, other hydrophilic or hydrophobic regions can be formed.

The chemistry of these layers can be significantly improved using a dopant compound. Dopants typically comprise metal or non-metal compounds in which the metal can be a divalent, trivalent, or polyvalent metal compound formed in the surface coating of the optical members of the invention. In certain structures the dopant can comprise $N^{+n}$ or $N^{-n}$, wherein n ranges form $-7$ to $+3$; $B^{+3}$ or other non-metal dopant materials. In other structures the dopant can comprise a noble gas in the layer. Preferably the noble gas dopant can comprise Argon (Ar) either in an uncharged species ($Ar^\circ$), a charged species (e.g. $Ar^{+1}$, etc.). Such dopants can be introduced using accelerated charged species that can interact with a target to form the dopant in a charged or neutral form.

We have found that such dopants can introduce hydrophilic or hydrophobic groups and can disrupt the surface character of the rough or ordered structure of the surface resulting in improved hydrophilicity or hydrophobicity of the layers in appropriate locales. In our work, we have found that linear or near linear silicon dioxide structures in which the —O—Si—O— bonding departs from linearity and has an angle of around 140° tends to be relatively hydrophobic and tends to be $Sp^2$ type bonding. We have found that chemically modifying the surface or adding dopants to the surface can enhance the $Sp^2$ type bonding of a crystalline layer and can increase the hydrophilicity of the coating surface. The creation of Lewis acid structures on the surface either by modifying the surface chemistry or by adding dopant materials can improve the $Sp^3$ type structure and introduce hydrophilic groups into the surface layers. The wettability of the surfaces can be measured using water drop contact angle measurements, receding or advancing water drop contact angle measurements and other measurements of the degree of association of water with the surfaces. Further, cleanability or washability of the surfaces can be measured using conventional ASTM methods set forth below. We have also found that the surface free energy of these surfaces can be modified by either enhancing the tendency of crystalline areas or amorphous areas. Crystalline areas tend to be hydrophilic while amorphous areas tend to be hydrophobic. In summary, the improved washability or cleanability of the surface coatings of the invention resides in the unique combination of surface nanostructure and surface chemistry which tends to reduce the binding forces between a soiled particle and the optical member surface. Further, the nature of the surface tends to cause the surface of the glass member to associate more strongly with water or aqueous cleaning solutions resulting in improved cleanability or wettability of the surface because the surface tends to associate with water or the solution rather than the soil particle. The term "optical member" used in the application and claims include materials that can be employed as a member in such applications as window panes, lenses, lasers and other members where the production transmission and reflection of light can be used.

The nanostructure of the surface coatings are an important aspect of the invention. We believe that the shape, size, dimensions and orientation of the surface structure are important characteristics. This geometry results in a substantially reduced bonding or association of soil particulate with the surface because the particulate tends to be held at a substantially increased average distance from the surface of the glass because of the nature of the relief. The structure can be either regular or random. A regular surface implies the creation of a structure that repeats at regular intervals typically between 1 and 800 nanometers, often between 2 and 500 nanometers, preferable between about 10 and 300 nm. Such regular structures can have a repeating triangular cross-section, a repeating rectangular cross-section, a repeating curvilinear cross-section, a repeating cubic cross-section or can appear as a regular array of circular plateaus or mesas, square plateaus or mesas, oval plateaus or mesas, hexagonal plateaus or mesas, etc. Further, the coatings of the invention can have a random character in which the structures are either amorphous or comprise a variety of geometric shapes or are of similar geometric shapes, but randomly oriented. In such a randomly formed structure, the dimensions of the structure are still critical. The structure still must have a dimension that departs from the mean surface of the structure by at least 1 nanometer, typically between about 1 and 800 nanometers.

Any optically transparent material including common glass materials can be used in the optical member of the invention. Preferred glasses are commodity glass made by converting glass sand into a melt that can be chemically modified using a variety of modification techniques and then floated in a non-oxidizing or reducing atmosphere in order to produce a flat optical member. The unique coating geometry and chemistry can be incorporated into the glass surface during such manufacture or can be introduced using production technology while after the glass is manufactured and formed to size.

The improved geometry of the coatings can be manufactured in a number of ways. First, a regular pattern of nanosized structure in a repeating linear array or a repeating regular array of structures having structural dimension of about 1 to about 800 nanometers can be made using x-ray lithography using incident radiation of appropriate wavelength. Lithography requires an incident radiation with a wavelength equal to or smaller to resolve the desired structural sizes. However, x-ray lithography is useful because of the short wavelengths (about 0.001 to 10 nanometers). In forming the structures of the invention, the glass can be coated with the appropriate chemical resist, masked with a mask of the appropriate dimensions and exposed using the short wavelength x-ray radiation. The mask can then be chemically stripped leaving exposed areas which can then be treated in a positive or a negative resist mode to form the unique geometry of the invention.

A randomly oriented pattern can also be made by codeposition of dissimilar materials. As the dissimilar materials associate with the surface of the optical member, the materials tend to agglomerate with similar materials and repel dissimilar materials. Such aggregation and segregation tends to form randomly generated areas having the preferred geometry and chemistry. Such a self-agglomerating or forming nature of such films are advantageous to forming the coatings of the invention. It should be understood that using nanostructure technology, visible light is unaffected by the coatings since the coating size has dimensions smaller than the wavelength of the incident visible light. In other words, such nanostructures are simply invisible to visible light. The ordered array of the chemical materials of the invention can comprise linear, curvilinear or a distribution of discrete round, square, triangular or other geometrically shaped mesas or plateaus having the appropriate nanostructure dimensions. The hydrophilic or hydrophobic properties can be formed on the glass surface or on the nanostructure surfaces formed using the methods of the invention. The ratio between the hydrophobic areas and the hydrophilic areas can be any desirable range depending on the anticipated soil type and amount of soil. The amount of hydrophobic character can range from about 4 square units of area to about 0.2 square unit of area per each 1 square unit of hydrophobic area. The dimensions between the repeating areas or mesas or islands of the structures of the invention should be maintained at a nanoscale; in other words, the maximum separation between the areas should be less than about 200 nanometers while the structure itself maintains a nanoscale of between 1 and 800 nanometers. The films of the invention can be made by any coating technology that can lay down a nanometer scale coating. Methods included in this coating technology include plasma vapor deposition, chemical vapor deposition and others including ion implantation, ion beam epitaxy, ion cluster beam deposition, thermal evaporation, sol-gel effects, sputtering, metallization, liquid polyphase chemical deposition.

The process of the invention forms a surface coating comprising silicon oxide ($SiO_2$), silicon carbide (SiC), silicon nitride ($Si_3N_2$) and other silicon compounds that can be used in such coating technologies. The silicon compounds can be post-treated under appropriate conditions to increase the hydrophilicity of the areas by introducing hydrophilic groups such as hydroxyl (OH) groups onto the surface of the coating material. Further, the coatings can be post-treated to increase the hydrophobicity of the surface by removing hydrophilic groups and introducing groups of comparatively reduced hydrophilicity.

The coating composition of the invention can contain a dopant in combination with a silicon material. Such dopant materials can comprise typically di-, tri- or polyvalent metal compounds that can be incorporated into the coating layers. Such polyvalent metal compounds can typically comprise metal species from groups in the Periodic Chart of Elements from IIA, IIIB, IVB, VB, VIB, VIIB, VIII, IB, IIB and metals from IIIA, IVA and VA. Currently, in our technology, we believe the preferred species include di-, tri- or polyvalent metal, vanadium, chromium, manganese, molybdenum, technetium, tantalutn, tungsten, rhenium, iron, cobalt, nickel, copper, zinc, lead, indium or mixtures thereof species having a high oxidation state. In this application, the term "high oxidation state" means an oxidation state attained by oxidizing the metal species to an oxidation state higher than the minimum state available for that metal compound. In other words, the higher oxidation state for manganese comprises $Mn^{+3}$, $Mn^{+4}$, $Mn^{+7}$, wherein the lowest available oxidation state comprises $Mn^{+2}$.

The washability or cleanability of the surfaces of the invention can be evaluated using the "Standard Practice for Preparation of Contaminated Test Coupons for the Evaluation of Cleaning Agents"—ASTM G 121—93; the "Standard Teat Method for Evaluating the Effectiveness of Cleaning Agents"—ASTM G 122—96; the "Standard Test Method for the Washability properties of Interior Architectural Coatings"—ASTM D 3450—94; and the "Standard Test Methods for Practical Washability of Organic Coatings" ASTM D 4828—94 or using minor modifications thereof.

The nature or dimensions of the surface structures of the invention can be measured using electron microscopic techniques. Further, the roughness or surface relief of the structures can be measured using the following non-microscopic techniques Scatterometry (10 to 10,000 angstroms). The nanostructure of the invention can have a major dimension of about 1 to 100 nm and a minor dimension of about 1 to 100 nm. The nanostructure of the invention can have a major dimension of about 1 to 100 nm and a minor dimension of about 1 to 100 nm. The term "major dimension" is defined to indicate that in any specific measurement of a dimensional parameter between features in the coating that the major dimension is measured to be larger than the minor dimension. Optical surfaces can be coated with a thin layer to improve cleanability. Such layers can be made by nanophase-separated polymer films. A method based on phase separation of macromolecular liquids to generate nanoporous or nanostructured polymer films can be used on optical surfaces. Instead of regular structures or homogeneous layers, a nanoporous film can be formed on the surface of an optical member. The pore or nanostructure size is typically much smaller than visible wavelengths. The goal of the technology is to obtain both nanostructure surfaces that occupy approximately half of the optical surface leaving approximately half of the optical surface unoccupied. These surfaces can be manufactured using sol-gel derived coatings, patterned surfaces with etched or carved micrometer gradings, high performance coatings tailored to the requirements of each application and other high performance multilayer coating technologies. One technique useful in making the nanostructures of the invention involves creating nanostructure polymer films capitalizing on the demixing or separation of a binary polymer blend during spin coating. Such nanostructures exhibit lateral phase morphology that strongly depends on the number of preparation parameters. The thin films appear featureless and transparent but have a nanostructure than can provide increased cleanability. Desirably, the length scale of the morphology lies well below the optical wavelength in a nanoporous nanostructure material. The general utility of this procedure is demonstrated using standard polymers and solvents. Polystyrene (PS) and polymethylmethacrylate (PMMA) were dissolved in tetrahydrofuran and spin cast onto an optical surface. After exposing the optical surface to a selective solvent for polystyrene, porous films can be made from the PMMA residue. Such films can typically have dimensions of greater than 10 nm and typically range from between about 75 nm and about 200 nm with a structure centered around 100 to 110 nm. The thicknesses and widths of the random nanostructures are approximately the same. A variety of other fundamentally incompatible/demixing macromolecular liquids can be used to form such random regions from which one or the other of the materials can be removed leaving the nanostructures. Such structures are shown in Walheim, *Journal of the American Chemical Society*, "Structure Formation Via Polymer Demixing and Spin-Cast Films" (ACS 1997).

Additional methods for making random or amorphous nanostructures involves selective deposition of silicon oxide. Selective deposition technology of thin films can also be used in fine structure formation. Selective deposition of silicon dioxide film using surface energy differences between materials can be helpful. Polyfluoroalkylacrylate (PFAA) can be used as a selective deposition mask. The PFAA has side chains which significantly reduce surface energy and prevent film formation. A gaseous mixture of $SiCl_4$ and water is used as a deposition gas. Such reactions can be run at approximately atmospheric pressure using silicon tetrachloride and water introduced into the reactor. The technique can be used to form fine patterns using a mask comprising the PFAA film. The PFAA film is irradiated with an electron beam. Unexposed PFAA can be selectively dissolved by solvents such as $Cl_2FC$—$CF_2Cl$. The resulting treated surfaces then contacted with the gaseous silicon tetrachloride and water at room temperature leaving a silicon dioxide film selectively formed on the resist area. The formed silicon dioxide areas also include SiOH groups and apparently water of hydration in the silicon structures. These techniques can form patterns of repeating or amorphous structures having sizes that range from about 80 to about 120 nm. Thin films of polystyrene (PS)-polyvinylpyridine (PVP) forming incompatible regions can be used to form regular or nanostructure easy clean surfaces. Polystyrene and polyvinylpyridine are strongly incompatible and coexist in separate phases having nanometer size structure dimensions. This technology is disclosed in Böltau et al., "Surface—induced structure formation of polymer blends on patterned substrates", *NATURE*, Vol. 391, pp. 877–879 (Feb. 26, 1998).

The resulting surface roughness can be measured using a variety of techniques. Surface roughness and scatter measurement instrumentation is made by Schmitt Measurement Systems Inc., a division of Schmitt Industries, Inc. Surface roughness can be measured in Angstroms ($10^{-10}$ meters) or other units. Apparatus using total integrated scatter measurements of incident light beams on a nanostructure surface can be used to define a bi-directional reflectance distribution function which relates to roughness of the nanostructure layers. Such scatterometry is known and can be used to calculate surface roughness. Further, atomic force microscopy is also useful in characterizing surface roughness.

Optical members include translucent or transparent members. Translucent members can be made by forming a layer on a side of the glass or by incorporating a layer internally. Such a layer disrupts the passage of light permitting the passage of light but not images. Transparent members are made of materials that permit transmittal of light in a manner that does not substantially distort an image. Such images include an aspect or environmental scene, an interior setting, an incandescent or florescent image, etc. Transparent members are typically made of noncrystalline materials used above the glass transition temperature. Transparent materials include inorganic glasses such as silicate glass, silicate-soda ash glass, borosilicate glass, etc.; thermoplastics such as polycarbonate, acrylic, etc. and other specialty crystalline and glassy materials.

The most common transparent members comprise silicate, and silicate-soda ash glass. Such glass technology has evolved since antiquity. These glass materials are typically understood to be an inorganic substance in a highly thickened but "liquid" state of the substance. As a result of a reversible change in viscosity, such materials attain such a high degree of viscosity to be, for all practical purposes (in a 40+ year useful life) rigid and non-flowing. Common silicate-soda ash window glass is manufactured from commonly available silicate ($SiO_2$) minerals and carbonate ($Na_2CO_3$) minerals. The basic structure of silicate glass is the silicon-oxygen tetrahedron in which a silicon atom is in an $sp^3$ tetrahedral bonding structure coordinated to four surrounding oxygen atoms. The oxygen shared between tetrahedron are called bridging oxygens. Virtually all such glass compositions comprise silicate glasses containing modifiers and intermediates. The addition of a modifier such as sodium oxide, boron compounds or sodium carbonate to the silica network alters the structure cleaving Si—O—Si bonds to form an Si—O—$Na^+$ or other modified linkage. Examples of chemicals that have been used to improve the physical nature of the glass layer include alkaline earth metal compounds; boric oxide compounds; alumino-silicate glass generating compounds; lead compounds; borate and phosphate glass compounds; oxides including germanium, arsenic, antimony oxides, etc,; sulfur, selenium and tellurium compounds; and halogens such as zinc chloride, and $BeF_2$ are also known. The purpose of these chemical modifications to the glass composition improves the mechanical properties such as hardness, the chemical stability, the heat resistance, or other physical or optical properties of the glass relating to end use requirements.

Most silica glass currently manufactured results from a process in which raw materials are converted at very high temperatures to an homogeneous flowable melt. The melt results from heating a combination of one or more typical ingredients such as glass sand ($SiO_2$), soda ash (sodium carbonate), limestone ($CaCO_3$), feldspar or other inorganic oxides such as potassium oxide, magnesium oxide, zinc oxide, barium oxide, lead oxide, etc. The inorganic materials are blended and melted at high temperatures typically from about 1500° C. to 1800° C. forming a flowable melt. The melt is then drawn from the heater and is drawn, rolled or quenched depending on the desired shape and end use. Bottle, dishes, optical lenses, tubes, sheets, cylinders, etc. are formed by floating, blowing, pressing, casting or spinning the glass to cool the glass to a solid. Large glass sheets are typically manufactured by floating the melt on molten tin in a non-oxidizing or reducing environment to form a planar extremely flat glass sheet with parallel faces. The glass face contacting the tin bath tends to acquire an amount of tin oxide ($SnO_2$) on the glass that typically range in trace amounts on the glass sheet. Such tin resides do not comprise any nanostructure regions but are only a random surface scattering of tin oxide. These chemically modified glasses typically enhance the macro thermal, electrical and mechanical properties of the gross material.

DETAILED DISCUSSIONS OF THE DRAWINGS

FIG. 1 shows a regular ordered pattern of nanostructure on a glass surface. The nanostructure 10 shows repeating peaks 11 and valleys 12 over a conventional glass surface (not shown). The distance between adjacent peaks 11 to 11 ranges from about 30 to about 180 nanometers. Similarly, the distance between the adjacent valleys, 12 to 12 ranges from about 30 to about 180 nanometers.

Figure 2:
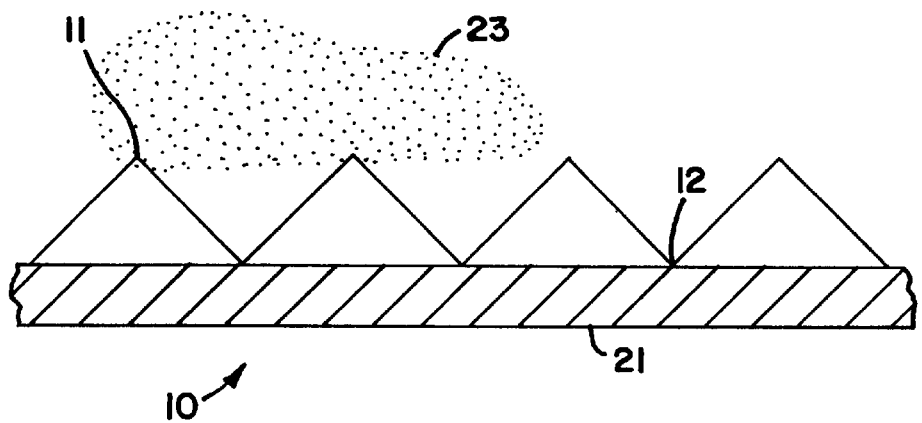

Similarly, FIG. 2 shows the nanostructure easy clean coating structure 10 of the invention. The structure is formed on a glass layer 21 with repeating triangular peaks and valleys 11, 12 formed on glass 21. Shown in phantom is a soil particle 23. The soil particle 23 contacts only the peaks 11 of the easy clean coating of structure 10. The unique geometry of the peaked structure substantially reduces the bonding strength of particle 23 to the coating structure 10. Other than the contact between the particle and the peak, the coating does not substantially contribute to any binding strength between structure 10 and particle 23.

Figure 3:
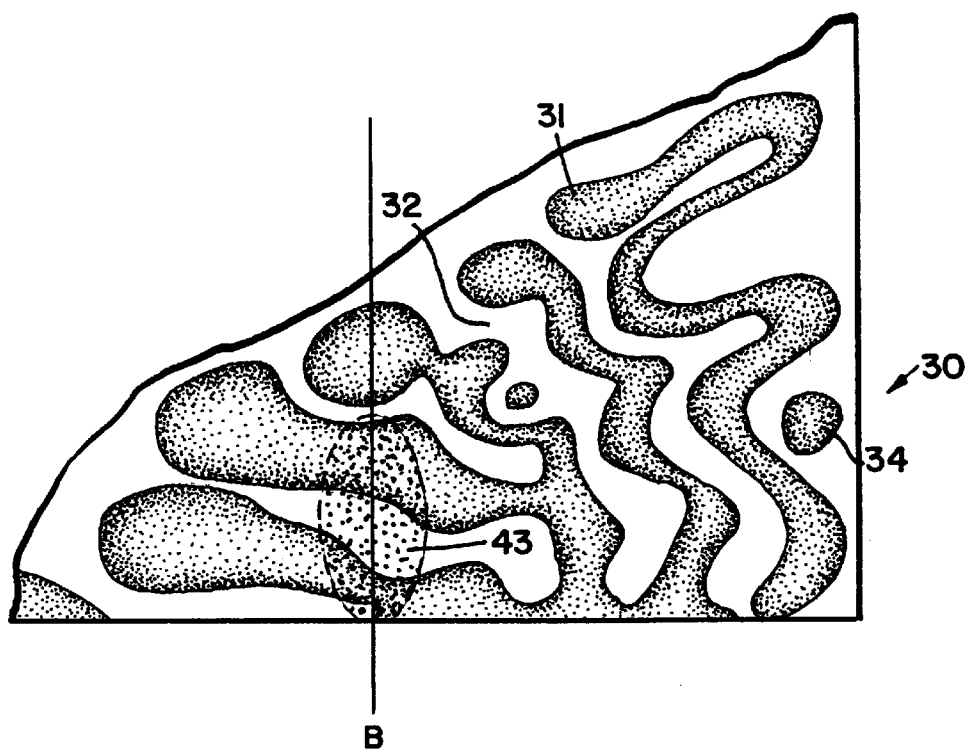
FIGS. 3 and 4 show a plan view and a cross-section of a glass sheet with an irregular nanostructure coating of the invention. The figures show a single random layer formed on the glass comprising the easily cleaned or washed coating of the invention.

FIG. 3 shows a substantially irregular or amorphous array of peaks and valleys in the easy clean coating of the invention. The peaks 31 are separated by valleys 32 on the easy clean structure 30 shown in FIG. 3. The amorphous coating is characterized by continuous random structures 31 and smaller unconnected structures 34.

Figure 4:
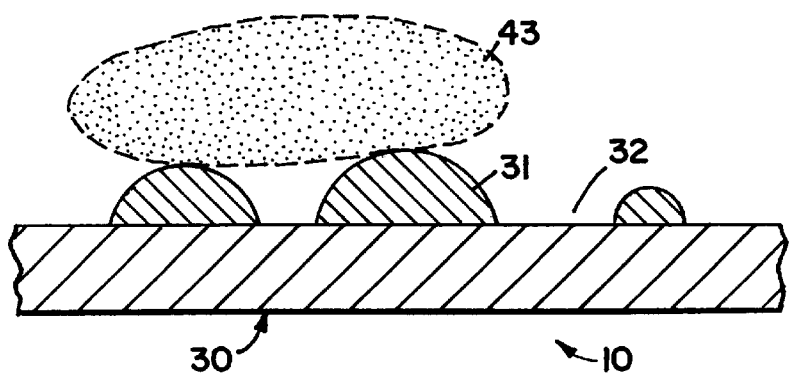

FIG. 4 is a side view of the structure of FIG. 3. In FIG. 4, the easy clean structures 30 is made by forming the structure on a glass 10 surface. The easy clean structure comprises peaks 31 and valleys 32 of the randomly distributed structure. A soil particle 43 is shown contacting the peaks of the nanostructure 31 comprising the easy clean coating in structure 30. The binding energy between particle 43 and the structure is reduced since the particle contacts only the extreme upper portions of the coating.

Figure 5:
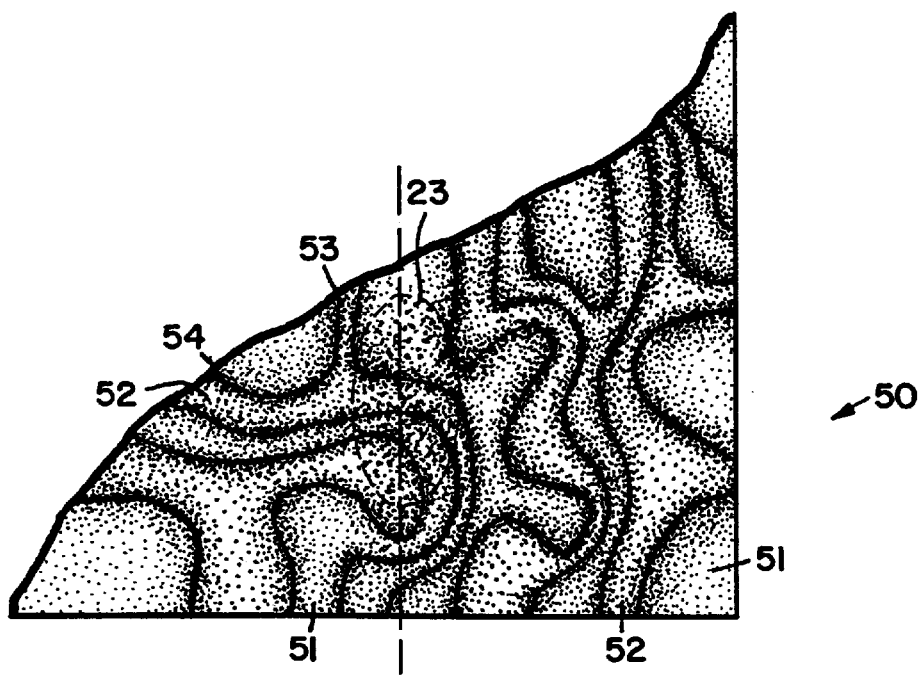
FIGS. 5 and 6 show a plan view and a cross-section of a glass sheet with an continuous and irregular nanostructure coating of the invention. The figures show a random layer formed on the glass with a heterostructure covering the glass of both hydrophillic and hydrophobic regions, the regions comprising the easily cleaned or washed coating of the invention.

FIG. 5 shows a substantially irregular or amorphous array of peaks and valleys in the easy clean coating of the invention that substantially covers the entire surface of the optical member. The hydrophobic areas 51 are separated from hydrophillic areas 52 on the easy clean structure 50 shown in FIG. 5. The interface 53, 54 between regions can comprise a mixed area or a sharp boundary. The amorphous coating is characterized by continuous random structures 51 and 52. A soil particle 23 is shown on the surface coating 51 and 52.

Figure 6:
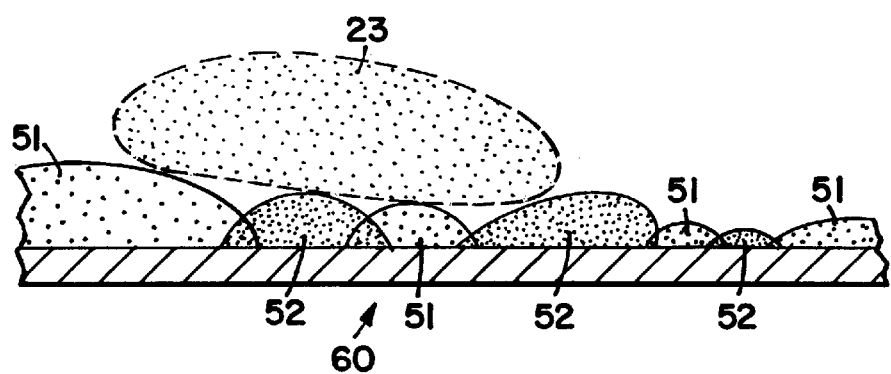

FIG. 6 is a side view of the structure of FIG. 5. In FIG. 6, the easy clean structures 51 and 52 are made by forming the substantially continuous structure on a glass 60 surface. A soil particle 23 is shown contacting the peaks of the nanostructure 51 and 52 comprising the easy clean coating in the structure. The binding energy between particle 23 and the structure is reduced since the particle contacts only the extreme upper portions of the coating.

The unique geometry and microstructure of the invention can improve the wettability of the surfaces to aqueous solutions and to aqueous cleaning solutions. The wettability of the surfaces can be measured by the water drop advancing contact angle measurements of ASTM Method No. D 5946—96. The enhanced wettability of these surfaces shows that the surface can preferentially associate with water and can preferentially repel hydrophobic soils when wetted appropriately. This tendency to associate with aqueous solutions improves the washability of the surfaces since it repels hydrophobic soils.

The above description fully illustrates the invention developed to date. While the optical members of the invention can be made using the disclosed technology can be made in a variety of embodiments, the invention resides in the claims hereinafter appended.

We claim:

1. An optical member having improved washing or cleaning properties when contacted with an aqueous solution, the member comprising a sheet-like transparent substrate having a first side and a second side, at least the first side comprising a nanostructure coating comprising a silicon compound, a titanium compound, a vanadium compound, a zirconium compound, a noble metal or compound thereof, an aluminum compound or mixtures thereof, said nanostructure coating having regions comprising a hydrophilic area and a hydrophobic area separated by a dimension less than about 500 nm, said nanostructure coating having a thickness sufficient to form a surface with improved washing or cleaning properties, said nanostructure coating additionally comprising a dopant in an amount effective to improve washing or cleaning properties.

2. The member of claim 1 wherein the substrate comprises a silica glass.

3. The member of claim 1 wherein the optical member is transparent.

4. An optical member having improved washing or cleaning properties when contacted with an aqueous solution, the member comprising a sheet-like transparent substrate having a first side and a second side, at least the first side comprising a nanostructure coating comprising a silicon compound, a titanium compound, a vanadium compound, a zirconium compound, a noble metal or compound thereof, an aluminum compound or mixtures thereof, said nanostructure having coating regions comprising a hydrophilic area and a hydrophobic area separated by a dimension less than about 500 nm, said nanostructure coating having a thickness of less than about 100 nm, said nanostructure coating additionally comprising a dopant in an amount of about 0.1 to about 10 parts of dopant per each one million parts of coating.

5. The member of claim 4 wherein the metal compound is a metal oxide, a metal carbide, a metal nitride or mixtures thereof.

6. The member of claim 4 wherein the dopant comprises a boron compound with the boron in an oxidation state equal to +3.

7. The member of claim 4 wherein the dopant comprises a nitrogen compound having nitrogen in an oxidation state equal to −7 to +3.

8. The member of claim 4 wherein the silicon compound comprises silicon oxide, silicon carbide, silicon nitride or mixtures thereof.

9. The member of claim 4 wherein the noble metal is $Ag^o$.

10. The member of claim 4 wherein the noble metal compound is AgCl.

11. The member of claim 4 wherein the nanostructure has a major dimension of about 1 nm to 100 nm.

12. The member of claim 4 wherein the nanostructure has a minor dimension of about 1 nm to 100 nm.

13. The member of claim 4 wherein the nanostructure comprises a divalent dopant compound metal comprising $Ca^{+2}$, $Mg^{+2}$, $Cr^{+2}$, $Ge^{+2}$ or mixtures thereof.

14. The member of claim 4 wherein the nanostructure comprises a trivalent metal dopant compound comprising $V^{+3}$, $Mn^{+3}$, $Fe^{+3}$, $Sb^{+3}$ or mixtures thereof.

15. The member of claim 4 wherein the nanostructure comprises a tetravalent metal dopant compound comprising $V^{+4}$, $Pd^{+4}$, $Pb^{+4}$ or mixtures thereof.

16. The member of claim 4 wherein the nanostructure comprises a pentavalent metal dopant compound comprising $V^{+5}$, $Nb^{+5}$, $Sb^{+5}$ or mixtures thereof.

17. The member of claim 4 wherein the nanostructure comprises a hexavalent metal dopant compound comprising $Cr^{+6}$, $W^{+6}$, $Re^{+6}$ or mixtures thereof.

18. The member of claim 4 wherein the nanostructure comprises a heptavalent metal dopant compound comprising $Mn^{+7}$, $Re^{+7}$ or mixtures thereof.

19. The member of claim 4 comprising a coating and a dopant on the second side.

20. The member of claim 4 wherein the member is planar.

21. The member of claim 4 wherein the member is a curved window.

22. The member of claim 4 wherein the member is transparent to visible light.

23. The member of claim 4 wherein the oxidation state of the dopant metal is +3 to +7.

24. The member of claim 4 wherein the optical member is translucent.

25. A method of washing an optical member comprising contacting an optical member having improved washing or cleaning properties with an aqueous cleaning solution, the member comprising a sheet-like transparent substrate having a first side and a second side, at least the first side comprising a nanostructure coating comprising a silicon compound, a titanium compound, a vanadium compound, a zirconium compound, a noble metal or compound thereof, an aluminum compound or mixtures thereof, said nanostructure coating having regions comprising a hydrophilic area and a hydrophobic area separated by a dimension less than about 500 nm, said nanostructure coating having a thickness sufficient to form a surface with improved washing or cleaning properties, said nanostructure coating additionally comprising a dopant in an amount effective to improve washing or cleaning properties.

26. The method of claim 25 wherein the member has improved cleanability to an aqueous cleaner.

27. The method of claim 25 wherein the aqueous cleaner comprises a surfactant.

28. The method of claim 25 wherein the optical member is transparent.

29. A method of making an optical member having improved washing or cleaning properties when contacted with an aqueous solution, the method comprising contacting a sheet-like transparent substrate having a first side and a second side with a coating means forming a coating on at least the first side, said coating comprising a nanostructure coating comprising a silicon compound, a titanium compound, a vanadium compound, a zirconium compound, a noble metal or compound thereof, an aluminum compound or mixtures thereof, said nanostructure coating having regions comprising a hydrophilic area and a hydrophobic area separated by a dimension less than about 500 nm, said nanostructure coating having a thickness sufficient to form a surface with improved washing or cleaning properties, said nanostructure coating additionally comprising a dopant in an amount effective to improve washing or cleaning properties.

30. The method of claim 29 wherein the optical member is translucent.

* * * * *